United States Patent
Chmielewski et al.

(10) Patent No.: US 10,223,143 B2
(45) Date of Patent: *Mar. 5, 2019

(54) SYSTEM AND METHOD FOR SUPPORTING JAVASCRIPT AS AN EXPRESSION LANGUAGE IN A PROCESS DEFINED BY A PROCESS EXECUTION LANGUAGE FOR EXECUTION IN A SOA MIDDLEWARE ENVIRONMENT

(71) Applicant: Oracle International Corporation, Redwood Shores, CA (US)

(72) Inventors: Michal Chmielewski, Sunnyvale, CA (US); Yogesh Kumar, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,713

(22) Filed: Mar. 21, 2016

(65) Prior Publication Data

US 2016/0291941 A1 Oct. 6, 2016

Related U.S. Application Data

(60) Provisional application No. 62/142,856, filed on Apr. 3, 2015.

(51) Int. Cl.
*G06F 9/455* (2018.01)

(52) U.S. Cl.
CPC ...... *G06F 9/45529* (2013.01); *G06F 9/45508* (2013.01)

(58) Field of Classification Search
CPC .... G06F 9/45508; G06F 9/45529; G06F 9/36; G06F 8/36

See application file for complete search history.

(56) References Cited

U.S. PATENT DOCUMENTS 6,266,681 B1 * 7/2001 Guthrie ............... G06F 9/4443
707/999.01
7,814,172 B2  10/2010 Martin
(Continued)

OTHER PUBLICATIONS

Philippa Gardner et al., "Towards a Program Logic for JavaScript", POPL' 12, Jan. 25-27, 2012, Philadelphia, PA, USA, Copyright © 2012, ACM, pp. 31-44.

(Continued)

*Primary Examiner* — Jacob D Dascomb
(74) *Attorney, Agent, or Firm* — Tucker Ellis LLP

(57) ABSTRACT

In accordance with an embodiment, described herein is a system and method for supporting JavaScript as an expression language in an executable process defined by a process execution language. An extension namespace to the process execution language can be used to define additional attributes for supporting JavaScript as an expression language. Used as an expression language, JavaScript can be used to access contents of XML variables in the executable process without the need to walk through complicated XML structures of the XML variables. A JavaScript expression can be used anywhere an XPath expression can be used, and can additionally be used to access a plurality of functions and variables that cannot be accessed using an XPath expression. A process execution engine can be provided on one or more application servers in a SOA middleware environment to host the executable process, wherein the process execution engine can include a JavaScript engine to interpret JavaScript expressions in the executable process.

18 Claims, 12 Drawing Sheets

(56) References Cited

U.S. PATENT DOCUMENTS

| | | | |
|---|---|---|---|
| 7,971,194 B1* | 6/2011 | Gilboa | G06F 8/10 717/106 |
| 9,582,301 B2 | 2/2017 | Feng | |
| 2003/0158832 A1 | 8/2003 | Sijacic | |
| 2004/0025180 A1* | 2/2004 | Begeja | G06F 17/30017 725/46 |
| 2005/0039165 A1* | 2/2005 | Wolff | G06F 8/423 717/114 |
| 2006/0095274 A1* | 5/2006 | Phillips | G06F 9/5038 717/108 |
| 2006/0190926 A1 | 8/2006 | Bennett | |
| 2008/0256357 A1 | 10/2008 | Iyengar | |
| 2011/0153630 A1* | 6/2011 | Vernon | G06F 17/30938 707/758 |
| 2011/0282709 A1 | 11/2011 | Rangaswamy | |
| 2014/0047413 A1* | 2/2014 | Sheive | H04L 65/403 717/110 |
| 2014/0157113 A1 | 6/2014 | Krishna | |
| 2014/0337816 A1* | 11/2014 | Chiluvuri | G06F 8/36 717/107 |
| 2015/0295983 A1 | 10/2015 | Hu et al. | |
| 2015/0363598 A1 | 12/2015 | Xu | |
| 2015/0378994 A1 | 12/2015 | Kaplinger | |

OTHER PUBLICATIONS

ORACLE ©, Matjaz B Juric, "A Hands-on Introduction to BPEL", 9 pages, retrieved on Oct. 25, 2014 from: <http://www.oracle.com/technetwork/articles/matjaz-bpel1-090575.html>.

ORACLE ©, Matjaz B Juric, "A Hands-on Introduction to BPEL, Part 2: Advanced BPEL", 12 pages, retrieved on Oct. 25, 2014 from: <http://www.oracle.com/technetwork/articles/matjaz-bpel2-082861.html>.

ORACLE ©, ORACLE © Fusion Middleware Developer's Guide for Oracle SOA Suite 11g Release 1 (11.1.1.4.0), "6 Manipulating XML Data in a BPEL Process", 42 pages, retrieved on Oct. 25, 2014.

ORACLE®, ORACLE® BPEL Process Manager Installation Guide 10g Release 2 (10.1.2) for Solaris Operating Environment (SPARC), Linux x86, and Microsoft Windows, "1 Overview of Oracle BPEL Process Manager", 7 pages, retrieved on Nov. 3, 2014.

Diane Jordan et al., "OASIS Web Services Business Process Execution Language Version 2.0; Committee Specification", Copyright® OASIS © 1993-2007, Jan. 31, 2007, 282 pages.

\* cited by examiner

SYSTEM AND METHOD FOR SUPPORTING JAVASCRIPT AS AN EXPRESSION LANGUAGE IN A PROCESS DEFINED BY A PROCESS EXECUTION LANGUAGE FOR EXECUTION IN A SOA MIDDLEWARE ENVIRONMENT

CLAIM OF PRIORITY

This application claims the benefit of priority to U.S. Provisional Application titled "SYSTEM AND METHOD FOR SUPPORTING JAVASCRIPT AS AN EXPRESSION LANGUAGE IN A BPEL PROCESS", Application No. 62/142,856, filed Apr. 3, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to service-oriented architecture (SOA) middleware environment, and are particularly related to a system and method for providing support for JavaScript as an expression language in an executable process defined by a process execution language for execution in a SOA middleware environment.

BACKGROUND

Today's organizations are increasingly adopting SOA to reduce information technology complexity and to deliver greater flexibility and speed. SOA can provide a standardized framework for assembling disparate enterprise SOA components into a higher-level composite, thereby simplifying development, deployment and management of enterprise applications. An example of such a high-level composite is a SOA composite application, which can include one or more service components defined by a process execution language. However, a typical process execution language uses syntaxes and expressions that are either inefficient, or unfamiliar to many developers of the new generation.

SUMMARY

In accordance with an embodiment, described herein is a system and method for supporting JavaScript as an expression language in an executable process defined by a process execution language. An extension namespace to the process execution language can be used to define additional attributes for supporting JavaScript as an expression language. Used as an expression language, JavaScript can be used to access contents of XML variables in the executable process without the need to walk through complicated XML structures of the XML variables. A JavaScript expression can be used anywhere an XPath expression can be used, and can additionally be used to access a plurality of functions and variables that cannot be accessed using an XPath expression. A process execution engine can be provided on one or more application servers in a SOA middleware environment to host the executable process, wherein the process execution engine can include a JavaScript engine to interpret JavaScript expressions in the executable process.

DETAILED DESCRIPTION

As enterprises are moving towards service-oriented architectures (SOA) to meet their information technology needs, different tools and middleware suites have been developed to provide a complete set of service infrastructure components for designing, deploying, and managing SOA composite applications.

SOA Application Development and Hosting Environment

Figure 1:
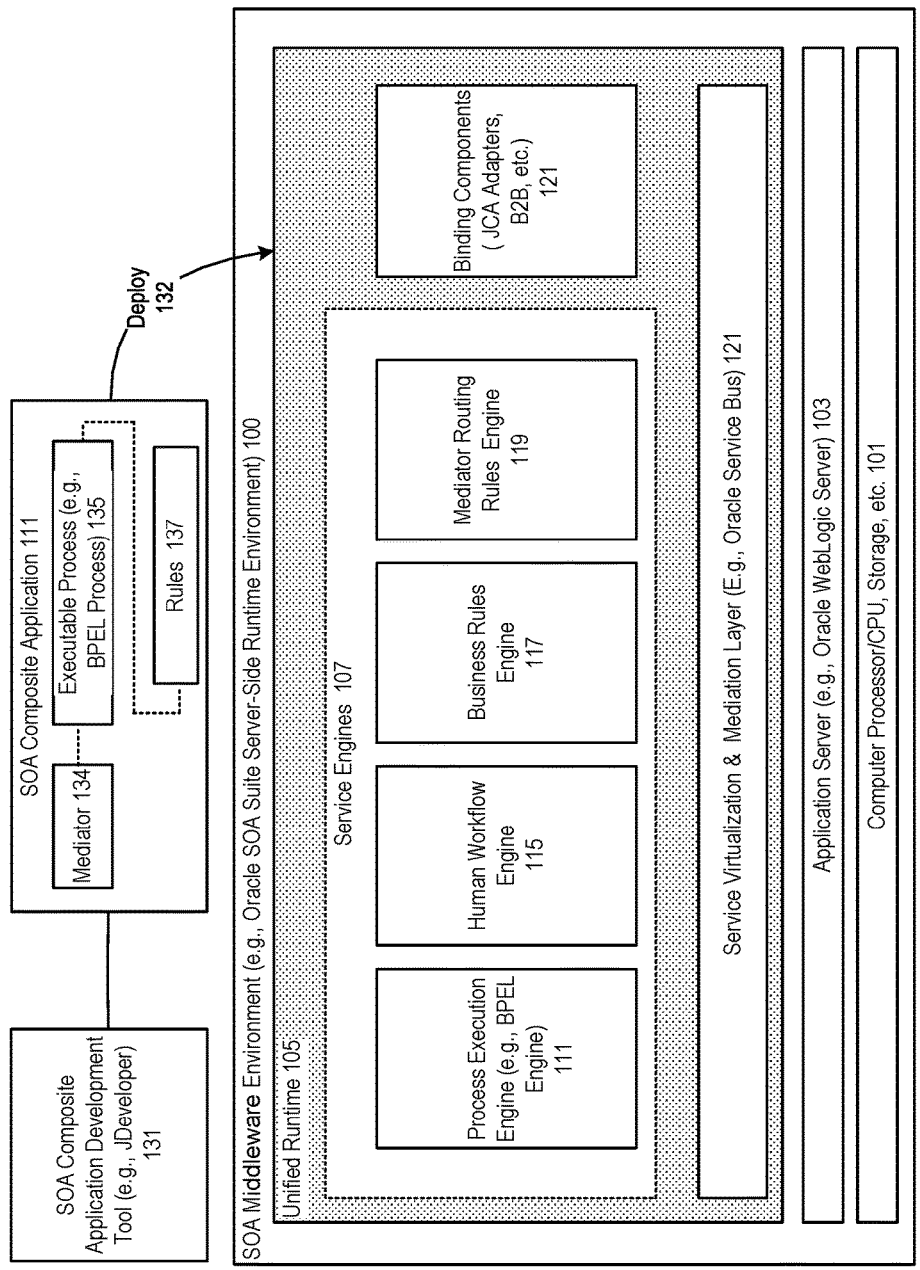
FIG. 1 illustrates an exemplary SOA middleware suite in accordance with an embodiment.

FIG. 1 illustrates an exemplary SOA middleware suite in accordance with an embodiment.

As shown in FIG. 1, the SOA middleware suite (for example, Oracle's SOA suite) can include a SOA composite application development tool (for example, Oracle's JDeveloper and similar interactive development environments) 131, and a SOA middleware environment 100. A user (for example, a developer) can use the development tool to design and configure a SOA composite application 111, and deploy 132 the SOA composite application as a deployment unit to the SOA middleware environment.

In accordance with an embodiment, the SOA composite application can include a plurality of service components, each of which service components can provide a logic to be used within the composite application.

For example, an executable process 135 defined by a process execution language (e.g., business process execution language (BPEL)) can provide process orchestration and storage of synchronous or asynchronous processes, and can integrate a series of business activities and services into an end-to-end process flow. A rules service component 137 an enable a developer to design a business decision based on rules. A mediator service component 134 can route events (messages) between different service components within the composite application.

In accordance with an embodiment, each service component can include a service binding component and a reference binding component. A service binding component can provide an entry point to the associated service component; and a reference binding component enables messages to be sent from a service component, and to access an external reference (for example, another service component). Each service or reference binding component can be a web service defined using a WSDL file. A SOA composite application can expose an application-level service binding component to provide an entry-point into the composite application, and can expose an application-level reference binding component to reference a service external to the composite application.

As further shown in FIG. 1, the SOA middleware environment can reside on an application server (for example, WebLogic Server) 103, and can include a unified runtime environment 105 with a plurality of service engines 107 and a plurality of binding components 121. The service engines can include a process execution engine (e.g., a BPEL engine) 111, a human workflow engine 115, a business rules engine 117, and a mediator routing rules engine 119.

In accordance with an embodiment, after being deployed, each service component of the SOA composite application can be hosted in its own service engine container, and the binding services and references in the composite application can be enabled using the binding components in the unified runtime environment, to enable message flows among the plurality of service engines.

Referring back to FIG. 1, the SOA middleware environment can further include a service virtualization and mediation layer 121 for use in mediating messaging among services from different composite applications within a network cluster.

Typical Process Defined by a Process Execution Language

In accordance with an embodiment, a process execution language such as BPEL can be used to define an executable process that includes a plurality of building blocks (for example, one or more activities and one or more services), to model a collection of related, structured tasks that produce a specific service or product. Such an executable process can be defined as an individual orchestration application, or as part of a SOA composite application.

Figure 2:
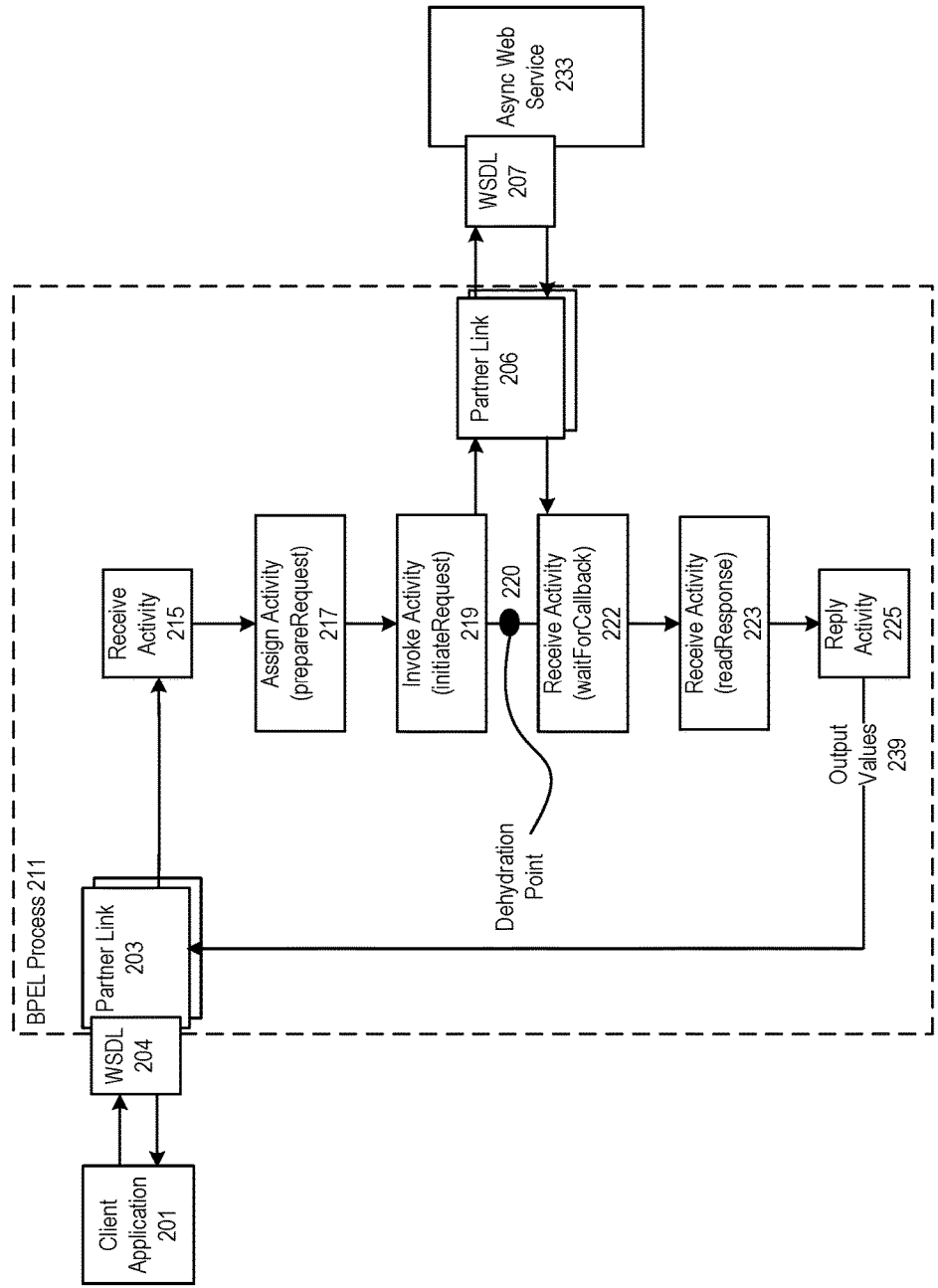
FIG. 2 illustrates the structure of an executable process defined by an exemplary process execution application for execution in a SOA middleware environment, in accordance with an embodiment.

FIG. 2 illustrates the structure of an executable process defined by an exemplary process execution application for execution in a SOA middleware environment, in accordance with an embodiment.

As shown in FIG. 2, an executable process (e.g., a BPEL process) 211 can interact with external components. The external components can include one or more web services (e.g., web service 233) invoked by the executable process; and one or more external clients (e.g., client application 201) that can invoke the executable process as a web service.

In accordance with an embodiment, the executable process can be defined to include a dehydration point 220, wherein the process states are persisted in a dehydration store (for example, a database) for scalability and reliability of the executable process.

In accordance with an embodiment, the executable process can include a plurality of process activities, each process activity being a building block and performing a specific task. For example, each of the Receive activities (i.e. Receive activities 215, 222 and 223) allows the executable process to perform a blocking wait for a particular message to arrive. An Assign activity 217 can be used for data manipulation, such as copying the contents of one variable to another, where the copy operation enables information to be transferred between variables, expressions, endpoints, and other elements in the executable process. An Invoke activity 219 allows the executable process to invoke a one-way or request-response operation on a portType provided by an external component. A Reply activity 225 allows the executable process to send a reply to a message received through a Receive activity.

As further shown in FIG. 2, the executable process can include partner links (for example, partner link 203 and partner link 206). A partner link can be a BPEL implementation of the service binding or reference binding described above, and can be associated with a WSDL file (for example, WSDL 204 and WSDL 207) describing interactions between the executable process and an external component.

In accordance with an embodiment, a partner link can define the relationship between the executable process and an external component (a partner) using port types and roles. A port type can be provided by each service to receive messages; and a role can specify a port type in the WSDL file, and can define the conversational aspect of the executable process or its partner. For a synchronous operation, a single role can be used, as the results are returned using the same operation. For an asynchronous operation, two roles may be needed, as the partner role switches during a callback.

In accordance with an embodiment, the executable process can define XML-based variables that are used to hold states of messages transmitted by the executable process, and can manipulate these XML variables, including data transformation between representations required for different services and local manipulation of data, e.g., combining results from several service invocations. XPath, a graph navigation language used to select a set of nodes from an XML document, can be used to perform this type of variable manipulations.

In accordance with an embodiment, the executable process can be designed, compiled and deployed to a process execution engine for execution. Source artifacts of the executable process (e.g., BPEL documents, WSDLs, and schemas) can be compiled into a representation suitable for execution. The compiled process representation can include an object model similar in structure to the underlying process documents with various named references resolved, required WSDL and type information internalized, and various constructs generated.

Support for Object Notation Variables

As a language for creating process work flows and orchestrating XML-based web services, a process execution language such as BPEL can rely heavily on extensible markup language (XML), and can use the syntaxes of XML to express various types of variables, and messages exchanged with external services. However, in XML, data is in a human-readable format and includes the structure information of that data. The structural requirement of XML, e.g., opening/closing tags for each element in a XML data object, can take up valuable space and make some common XML operations expensive in an executable process defined by the process execution language.

For example, an assignment from XML variable A to XML variable B in the executable process would typically copy an XML object stored in A to B node by node. Another expensive operation is a service invocation, which typically involves setting up an input variable with one or more parameters of the invocation, and invoking a web service using the input parameters. The XML results can then be copied into a local variable when the invoked service returns. In addition, the strictly-typed XML variables require that the exact shapes (for example, structures) of these variables be known in advance in order to process them.

With the increasing popularity of mobile applications, more developers are requesting support for "un-typed" variables in an executable process defined by a process execution language, to meet the performance needs of the mobile applications. An object notation (e.g., JavaScript Object Notation (JSON)) can store information in an organized and easy-to-access manner, and is inherently more efficient than XML. In addition, data in an object notation variable (e.g., a JSON variable) can be represented as JavaScript objects, and can be processed by JavaScript. As such, an object notation variable is a typical un-typed variable.

In accordance with an embodiment, the system supports object notation variables in an executable process defined by a process execution language for execution in a SOA middleware environment. An extension namespace can define additional methods and attributes to enable support for object notation variables in the executable process. With the support for object notation variables, the executable process can be defined to include a representational state transfer (REST) partner link, for directly receiving object notation payloads from an external service into an object notation variable in the executable process, where the object notation variable can be accessed and manipulated using JavaScript.

In accordance with an embodiment, unlike XML variables whose types are strictly defined in a schema file and validated, object notation variables in the executable process are not validated at runtime, which can provide flexibility and additional performance advantage.

In accordance with an embodiment, the extension namespace can be an extension to a specification-based process execution language, and can be included in a process designer to display extension hooks, e.g., user-defined activities and explicit extension constructs, to facilitate integration of object notation variables into an executable process defined by the process execution language.

In accordance with an embodiment, the executable process can include a plurality of elements, for example, a top level element process, partner links, and variables, and process activities. A process executable can be created out of these elements and deployed to a process execution engine. Each variable in the executable process can be a document with a name and a type. For example, a purchase order variable can be defined by a document named "purchase order" using an object notation format. The object notation variable can be accessed using JavaScript, and data in the variable can be passed between the executable process and an external service using a REST partner link.

Figure 3:
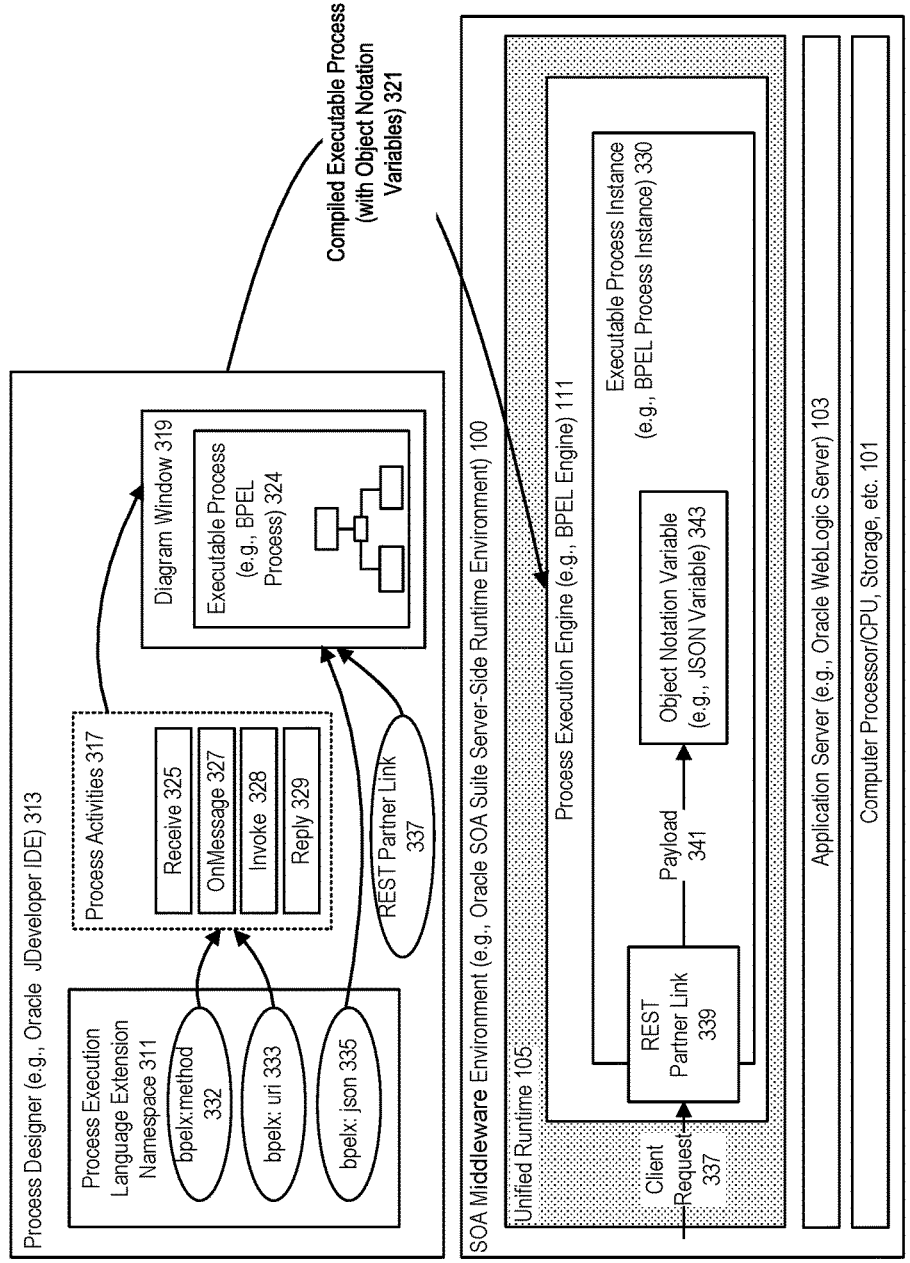
FIG. 3 illustrates a system for supporting object notation variables in an executable process defined by a process execution language for execution in a SOA middleware environment, in accordance with an embodiment.

FIG. 3 illustrates a system for supporting object notation variables in an executable process defined by a process execution language for execution in a SOA middleware environment, in accordance with an embodiment.

As shown in FIG. 3, a process designer 313 (for example, Oracle's JDeveloper IDE) can include a process execution language extension namespace 311 that defines a plurality of extension attributes (for example, "bplex:method" 332, "bplex:uri" 333, and "bpelx:json" 335) to enable support for object notation variables. In the example attributes above, the "bpelx" prefix can refer to the extension namespace, an example of which can be http://schemas.oracle.com/bpel/extension for extension hooks in BPEL processes.

In accordance with an embodiment, the "bplex:json" attribute can be used to declare object notation variables. Using this attribute, standard object notation variable types such as "object", "array", "number", "string", and "boolean", or any type bound to an object notation schema, can be declared and supported in an executable process defined by the process execution language.

In accordance with an embodiment, however, "messageType" is not needed for supporting object notation variables in an executable process defined by the process execution language, because "messageType" is a WSDL artifact and does not translate into the object notation world. Similarly, XPath does not apply to object notation objects. For example, an XPath expression cannot be used to access an object notation object. Instead, an object notation variable can be accessed using the dot notation. In addition, a wiring of REST XML media-type to the executable process with pure object notation variables can result in a compile failure.

In accordance with an embodiment, declared object notation variables are not required to comply with or type-checked by an XML schema at compile time. When an executable process defined by the process execution language receives an object notation variable from a web service, the exact shape (for example, structure) of the object notation variable does not need to be known by the process.

In accordance with an embodiment, a segment of an exemplary executable process that supports object notation variables can be illustrated below in Listing 1:

---

Listing 1

```
<bpel:variables>
    <bpel:variable name="order"   bpelx:json="object"/>
    <bpel:variable name="items"   bpelx:json="array"/>
</bpel:variables>
<bpel:variables>
    <bpel:variable name="count"   bpelx:json="number"
    bpelx:value="1"/>
    <bpel:variable name="flag"    bpelx:json="boolean"/>
    <bpel:variable name="name"    bpelx:json="string"
bpelx:value="foobar"/>
</bpel:variables>
```

---

As shown in Listing 1, the object notation variable types of "object", "array", "number", "boolean" and "string" are declared using the "bpelx:json" attribute.

As further shown in FIG. 3, additional extension features (for example, REST partner link 337) can be added to the process designer for supporting object notation variables. REST is a web service model that is a simpler alternative to SOAP and WSDL based web services, and can enable message exchanges over HTTP using various protocols including XML and object notations.

In accordance with an embodiment, a REST partner link does not require the "portType" or "role" attribute that is required by a standard partner link. Instead, a REST partner link can be used to pass a payload of client request data to an executable process defined by a process execution language, and the payload can be directly received into an object notation variable in the executable process.

Listing 2 shows a REST partner link in accordance with an embodiment.

---
Listing 2
---
```
<receive
    name="start"
    partnerLink="client"
    operation="order" variable="po"
    createInstance="yes"
/receive>
```
---

As illustrated in Listing 2, a partner link shown above does not require "portType", and "role" attributes as a standard partner link.

In accordance with an embodiment, a client application can use the following code to pass an object notation payload to an executable process defined by a process execution language (e.g., a BPEL process).

---
Listing 3
---
```
POST /soa-infra/resources/default/Coffee/client/order HTTP/1.1
Content-Type: application/json
Accept: application/json,text/json,text/plain,text/xml; q=0.8
{
    billTo: {
        name : "John Doe" ,
        email: "John.does@mycompany.com",
        phone: "+1-415-xxx-xxxx"
    },
    items: [{
        quantity: 1,
        price : 2.99,
        desc : "Coffee"
    }]
}
```
---

As shown in Listing 3, the object notation payload providing the details of the order object can be passed to an executable process using a REST partner link.

In accordance with an embodiment, the REST partner link can be used to pass object notation payloads from an executable process defined by a process execution language, to an external service. This type of transmittal operation is a more efficient way of passing messages and data than an operation using a standard partner link, wherein XML-based messages or data have to be mapped, converted and copied, which is time consuming and resource expensive considering the rich structures of XML-based messages or data.

In accordance with an embodiment, a REST partner link can be defined using web application description language (WADL), a machine-readable XML description of HTTP-based REST web services.

Extensions to Standard Process Activities

In accordance with an embodiment, some extension attributes or features (for example, "bpelx:json" and REST partner links) can be used directly when designing an executable process 324 in a diagram window 319. Other extension attributes or features (for example, "bpelx:method" and "bpelx:uri") can be added to a plurality of standard process activities 317 to extend these activities, to enable support for object notation variables. In addition, existing attributes of these process activities can be modified to perform different functions. The process activities can be dragged, and dropped in the diagram window for use in designing the executable process.

In accordance with an embodiment, the plurality of process activities can include a Receive activity 325, an OnMessage activity 327, an Invoke activity 328, and a Reply activity 329. In the Receive and OnMessage activities, the "bpelx: method" can define an HTTP method to be bound to; and the "bpelx:uri" attribute can define the URI (e.g., from an object JSON hyperschema) which the Receive activity, or the OnMessage activity, can be bound to. The standard existing "variable" attribute in the Receive and the OnMessage activities can be used to define variables and types of the variables, which a message is to be delivered to.

In accordance with an embodiment, for the Invoke and Reply activities, the "bpelx:method" attribute can define the HTTP method that can be used for outbound calls (the default method can be "get"); and the "bpelx:uri" attribute can refer to the URI of the service to be invoked. The standard/existing "inputVariable" and "outputVariable" attributes can be utilized to provide payloads and responses for service calls.

In accordance with an embodiment, the executable process can be compiled 321 and deployed on the process execution engine, wherein the executable process can be instantiated as one or more executable process instances (for example, an executable process instance 330) for execution.

As further shown in FIG. 3, a REST partner link (for example, partner link 339) can be used to pass a payload of client request data 337 to the executable process instance, wherein the payload can be directly received 341 into an object notation, without the expensive conversions and mappings between XML objects/variables typical in a standard process defined by a process execution language (e.g., a typical BPEL process). Once received into an object notation variable, the payload can be directly manipulated by JavaScript artifacts in the executable process instance.

Figure 4:
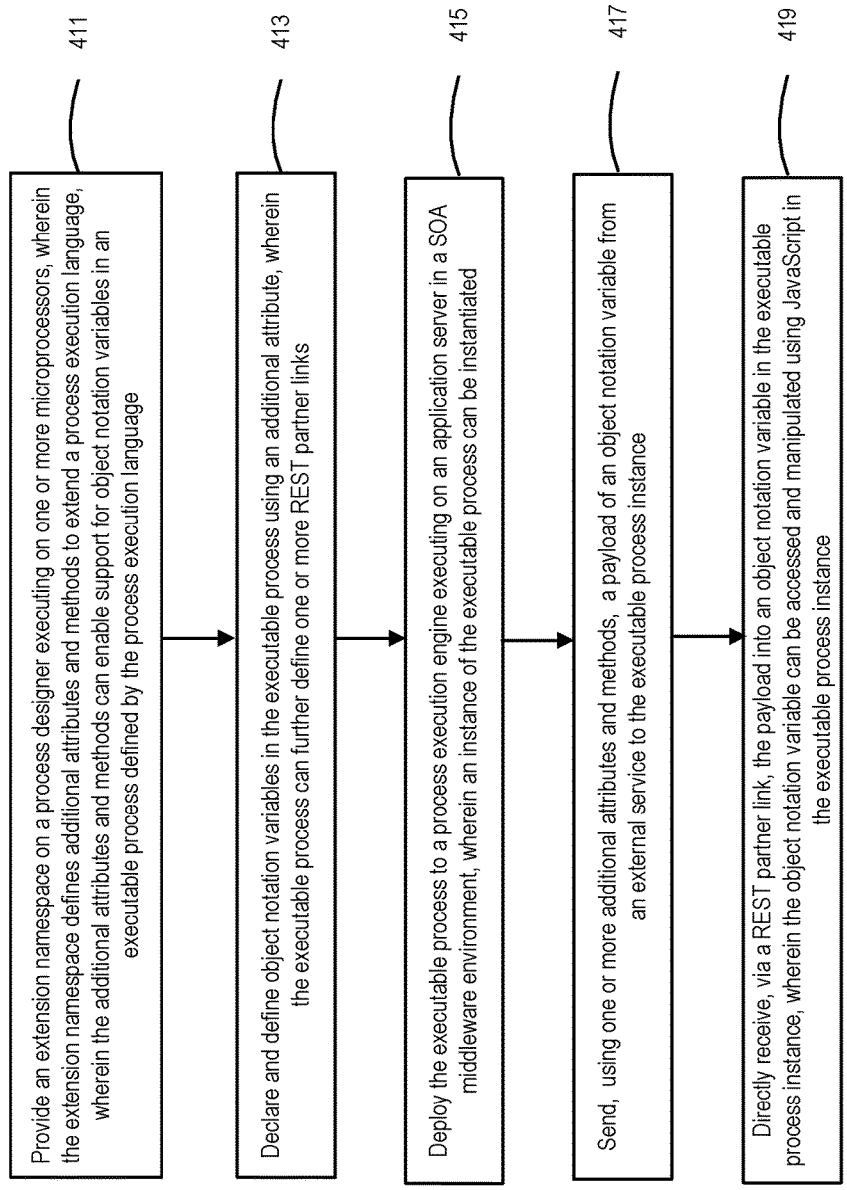
FIG. 4 illustrates a method for supporting for object notation variables in an executable process defined by a process execution language for execution in a SOA middleware environment, in accordance with an embodiment.

FIG. 4 illustrates a method for supporting for object notation variables in an executable process defined by a process execution language for execution in a SOA middleware environment, in accordance with an embodiment.

As shown in FIG. 4, at step 411, an extension namespace can be provided on a process designer executing on one or more microprocessors, wherein the extension namespace defines additional attributes and methods to extend the process execution language, wherein the additional attributes and methods can enable support for object notation variables in the executable process.

At step 413, object notation variables can be declared and defined in the executable process using an additional attribute, wherein the executable process can further define one or more REST partner links.

At step 415, the executable process can be compiled, and deployed to a process execution engine executing on an application server in the SOA middleware environment, wherein an instance of the executable process can be instantiated.

At step 417, a payload of an object notation variable in an external service can be sent, using one or more additional attributes and methods, from that service to the executable process instance.

At step 419, the payload can be directly received, via a RESET partner link, into an object notation variable defined in the executable process instance, wherein the object notation variable can be accessed and manipulated using JavaScript.

Support for JavaScript Activities

Over the years, many legacy applications and open source JavaScript libraries, e.g., JQuery Mobile Library, have been developed. In addition, JavaScript is closely integrated with object notation objects (e.g., JSON) and can be used to directly manipulate these objects. As such, support for a JavaScript activity in an executable process defined by a process execution language can provide the advantages of saving development time by reusing legacy JavaScript code.

In accordance with an embodiment, the system supports JavaScript activities in an executable process defined by a process execution language. A JavaScript activity can be added to the executable process using attributes defined in an extension namespace to the process execution language. A process execution engine, with an embedded JavaScript engine, can be provided in a SOA middleware environment, to interpret JavaScript artifacts within the JavaScript activity and to provide contextual information, states and payloads of variables in the executable process. Within the JavaScript Activity, JavaScript code can be used to access a plurality of custom JavaScript objects, e.g., Console object; XPath functions and custom functions defined by the process execution language; and different types of variables in the executable process, including object notation variables and XML variables. JavaScript code can also be used to manipulate these variables using the XPath functions and custom functions accessible within the JavaScript activity.

With support for JavaScript activities, a developer can use JavaScript in an executable process defined by a process execution language such as BPEL, to model a collection of related, structured tasks that produce a specific service or product. The use of JavaScript, a language of choice for many mobile developers, enables a developer to access legacy code (for example, XPath functions and custom BPEL functions) as well as existing JavaScript libraries.

Further, XML variables and XPath functions can still be supported in an executable process defined by the process execution language. As such, a hybrid executable process can be supported in a SOA middleware environment, to allow developers of different skill sets to work on the same executable process defined by the process execution language.

Figure 5:
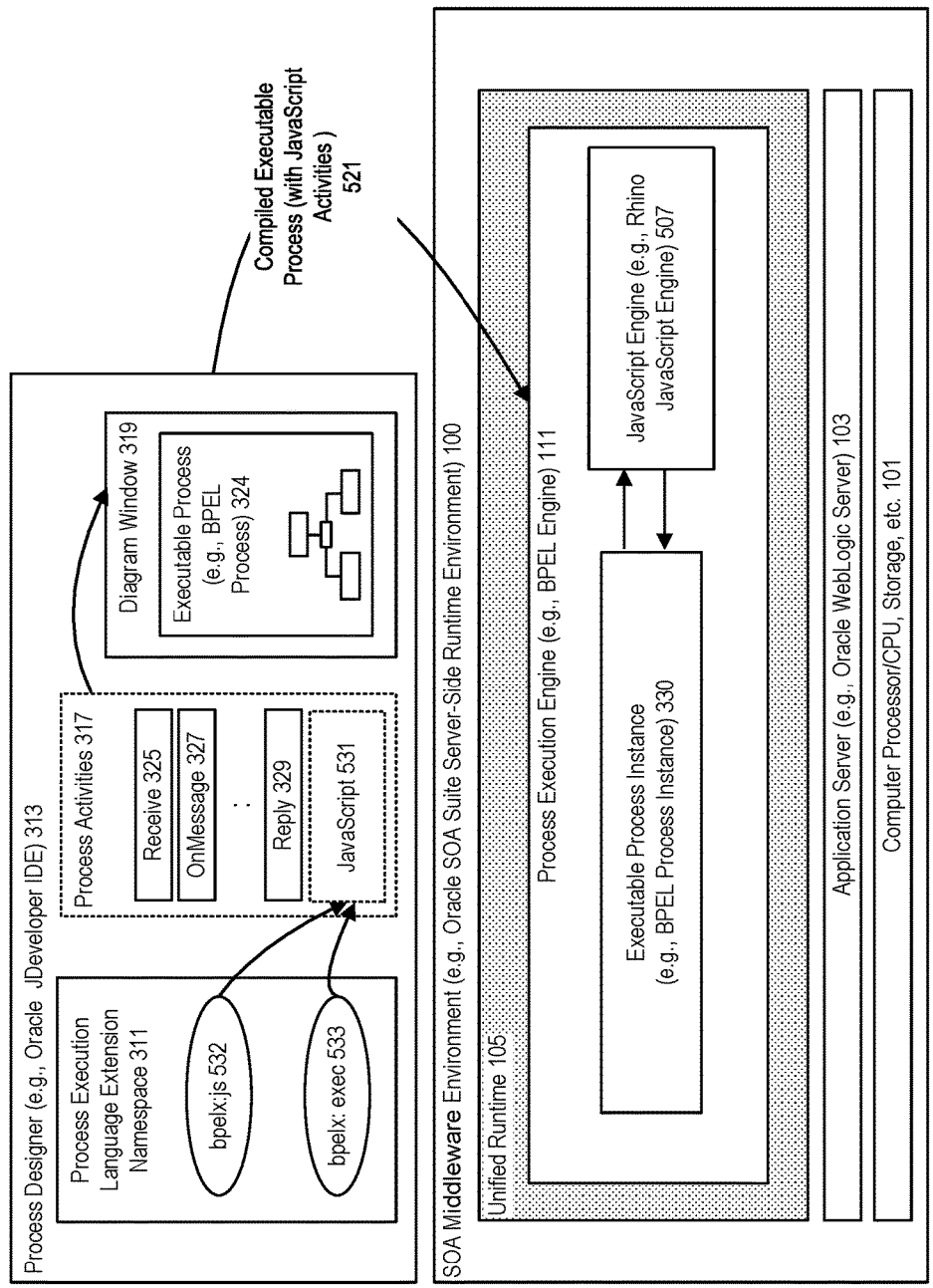
FIG. 5 illustrates a system for supporting JavaScript activities in an executable process defined by a process execution language for execution in a SOA middleware environment, in accordance with an embodiment.

FIG. 5 illustrates a system for supporting JavaScript activities in an executable process defined by a process execution language for execution in a SOA middleware environment, in accordance with an embodiment.

As described above, the process designer can include a plurality of process activities that can be dragged and dropped into an executable process under development. Each process activity can be defined by a process execution language such as BPEL, and can perform a specific task within the executable process.

As shown in FIG. 5, a JavaScript activity 531 can be added to the process designer using the process execution language extension namespace. To add the JavaScript activity, the "bpelx:exec" activity 533 defined in the extension namespace can be extended, so that the process activities can understand the attribute "language=javascript" or "language=js". The "bpelx:exec" activity can be further modified to include an "include" attribute, which can be used to define a source file for inclusion in a component level JavaScript execution scope.

As further shown in FIG. 5, a "bpelx:js" activity 532 can be defined in the extension namespace, and can include an "include" attribute for use in defining a JavaScript source file to be incorporated into the executable process.

In accordance with an embodiment, the added JavaScript activity can be dragged and dropped in the process designer window, where a JavaScript developer can write a business logic within the JavaScript activity for the executable process using JavaScript.

In accordance with an embodiment, the compiled executable process can be deployed 521 to the process execution engine that includes a JavaScript engine 507 to interpret the JavaScript code. The JavaScript engine can be an open-source JavaScript engine, for example Mozilla Rhino.

Figure 6:
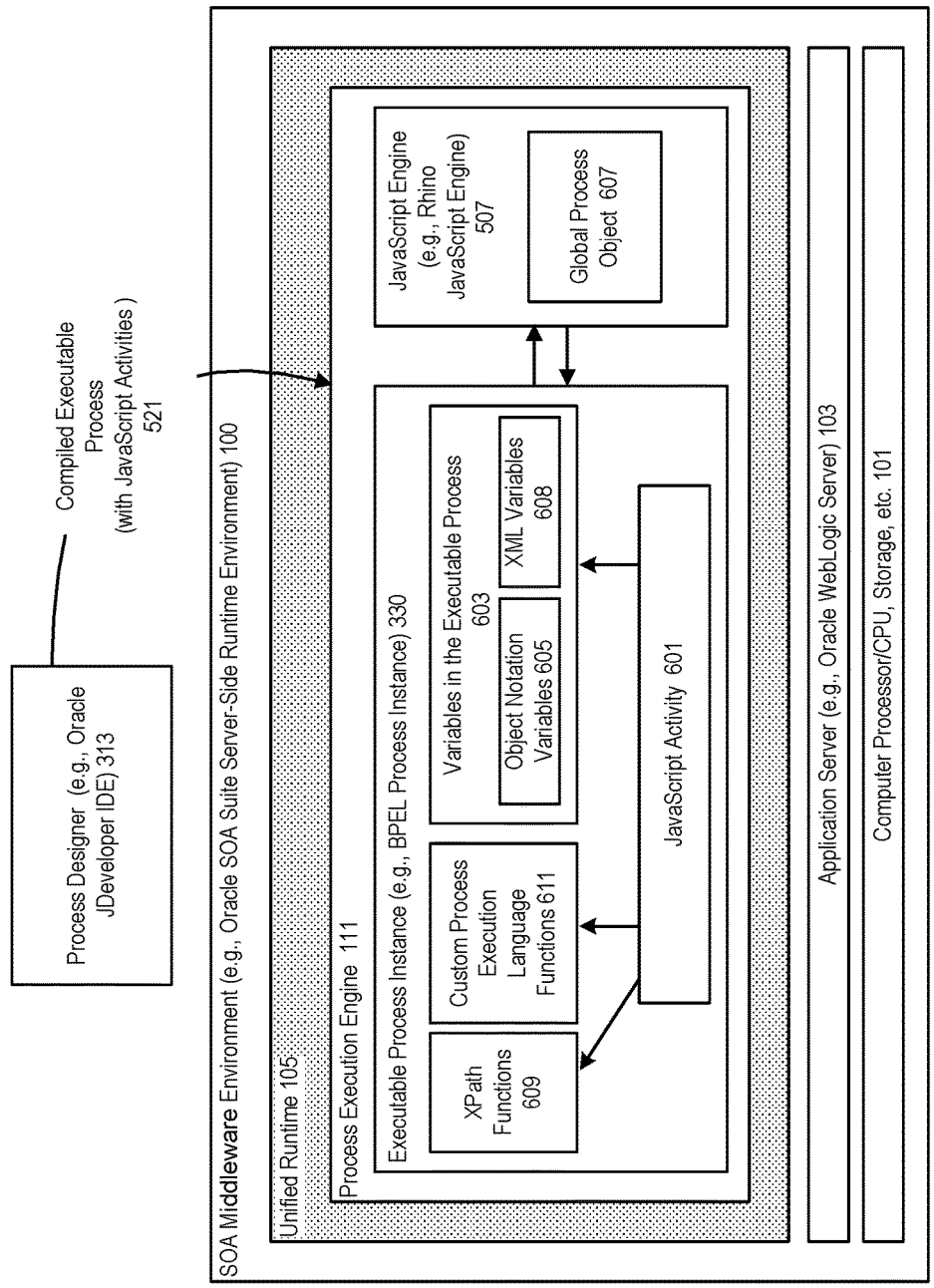
FIG. 6 further illustrates a system for supporting JavaScript activities in an executable process defined by a process execution language for execution in a SOA middleware environment, in accordance with an embodiment.

FIG. 6 further illustrates a system for supporting JavaScript activities in an executable process defined by a process execution language for execution in a SOA middleware environment, in accordance with an embodiment.

As shown in FIG. 6, the compiled executable process (e.g., a BPEL process), once deployed to the process execution engine, can be instantiated as an executable process instance 330. Within a JavaScript activity 601 of the executable process instance, JavaScript syntaxes can be used to access various types of variables 603 (for example, object notation variables 605 and XML variables 608). For example, an object notation variable can be accessed using "process.po.items[1].price", where "po" represents an objet notation object including an "item" array. An XML variable supporting E4XML object navigation can be accessed using, e.g., "process.po.ns:items[1]@ns::price".

As further shown in FIG. 6, within the JavaScript activity, XPath functions 609 and custom process execution language functions (e.g., custom BPEL functions) 611 can be accessed using JavaScript syntaxes. One or more custom JavaScript objects, e.g., a Console object, can also be accessed within the JavaScript activity.

Listing 4 shows an example JavaScript activity in an executable process defined by a process execution language, in accordance with an embodiment.

Listing 4

```
<bpelx:js name="prepareOrder">
// xpath.* –> all xpath functions present in BPEL,
xpath.{prefix}.{function}(args)
var po = process.po;
process.order = {
    order: xpath.ora.getECID( ),
    amount: process.amount,
    email  : po.billTo.email,
    date   : bpel.until(0),
    name   : po.billTo.name,
    phone  : po.billTo.phone,
    status : "started"
}
process.orderID = process.order.order;
// Write to Console
console.log("order prepared to be stored ",jsonpp(process.order));
// Write to service orchestration Audit
audit.log("order prepared to be stored ",  process.order);
</bpelx:js>
```

As shown in Listing 4, within the JavaScript activity "prepareOrder", JavaScript code can be used to access variables declared in the executable process, and XPath functions (e.g., xpath.ora.getECID()), and custom process execution language functions (e.g., bpel.util()).

In accordance with an embodiment, contextual information, states and payloads of the variables being accessed within the JavaScript activity can be provided by the process execution engine. A global process object 607 can be created inside an instance of the JavaScript engine, to provide bindings for message context information of the variables. From the global process object, the JavaScript activity can read/update values of the variables.

Figure 7:
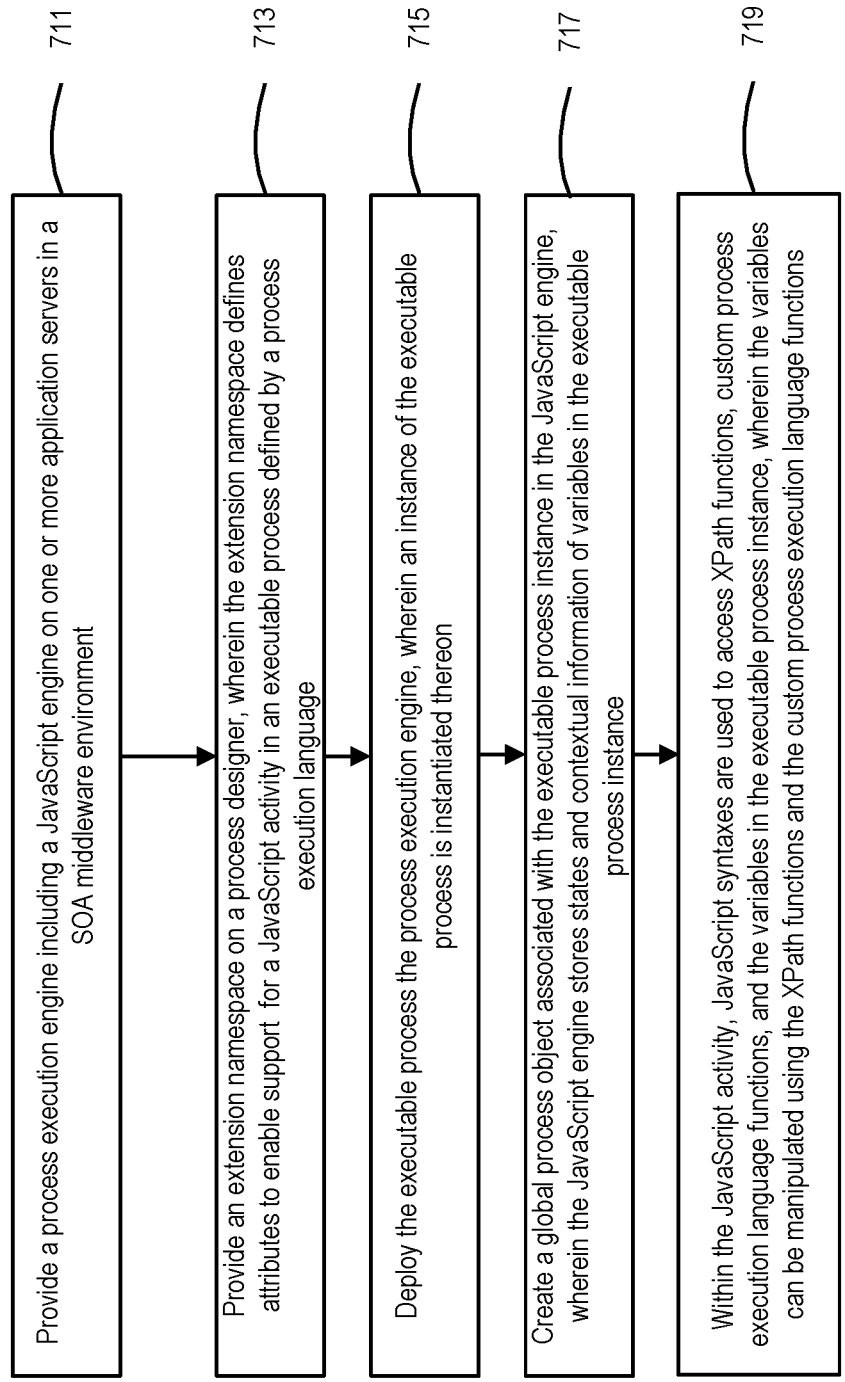
FIG. 7 illustrates a method for supporting JavaScript activities in an executable process defined by a process execution language for execution in a SOA middleware environment, in accordance with an embodiment.

FIG. 7 illustrates a method for supporting JavaScript activities in an executable process defined by a process execution language for execution in a SOA middleware environment, in accordance with an embodiment.

As shown in FIG. 7, at step 711, a process execution engine including a JavaScript engine can be provided on one or more application servers in a SOA middleware environment.

At step 713, an extension namespace can be provided on a process designer, wherein the extension namespace defines attributes to enable support for a JavaScript activity in the executable process.

At step 715, the executable process can be deployed on the process execution engine, wherein an instance of the executable process is instantiated thereon.

At step 717, a global process object associated with the executable process instance is created in the JavaScript engine, wherein the global process object stores states and contextual information of variables in the executable process instance.

At step 719, within the JavaScript activity, JavaScript syntaxes are used to access XPath functions, custom process execution language functions, and the variables in the executable process instance, wherein the variables can be manipulated using the XPath functions and the custom process execution language functions.

Support for JavaScript Expressions

In an executable process defined by a process execution language, for example a BPEL process, XML variables need to be accessed, evaluated and manipulated for tasks to be performed. XPath is an expression language that provides a means for hierarchically addressing the nodes in an XML tree in the executable process. The result of an XPath expression can be a selection of nodes from an input document, an atomic value, or more generally, any sequence allowed by a data model.

In accordance with an embodiment, the system supports JavaScript as an expression language in an executable process defined by a process execution language. An extension namespace to the process execution language can be used to define additional attributes for supporting JavaScript as an expression language. Used as an expression language, JavaScript can be used to access contents of XML variables in the executable process without the need to walk through complicated XML structures of the XML variables. A JavaScript expression can be used anywhere an XPath expression can be used, and can additionally be used to access a plurality of functions and variables that cannot be accessed using an XPath expression. A process execution engine can be provided on one or more application servers in a SOA middleware environment to host the executable process, wherein the process execution engine can include a JavaScript engine to interpret JavaScript expressions in the executable process.

Support for JavaScript as an expression language can provide flexibility for developers to choose a different expression language in designing an executable process defined by a process execution language.

For example, this feature allows a traditional developer to use JavaScript in an existing process structure, or JavaScript coders to work on the existing process structure without learning XPath syntaxes.

Further, with support for JavaScript as an expression language, use of JavaScript is not restricted within a JavaScript activity in the executable process defined by process execution language (e.g., a BPEL process), as described above. Instead, a JavaScript expression can be used anywhere in the executable process where an XPath expression can be used, to address the nodes in an XML tree in the executable process, and to evaluate and manipulate data in variables in the executable process.

Figure 8:
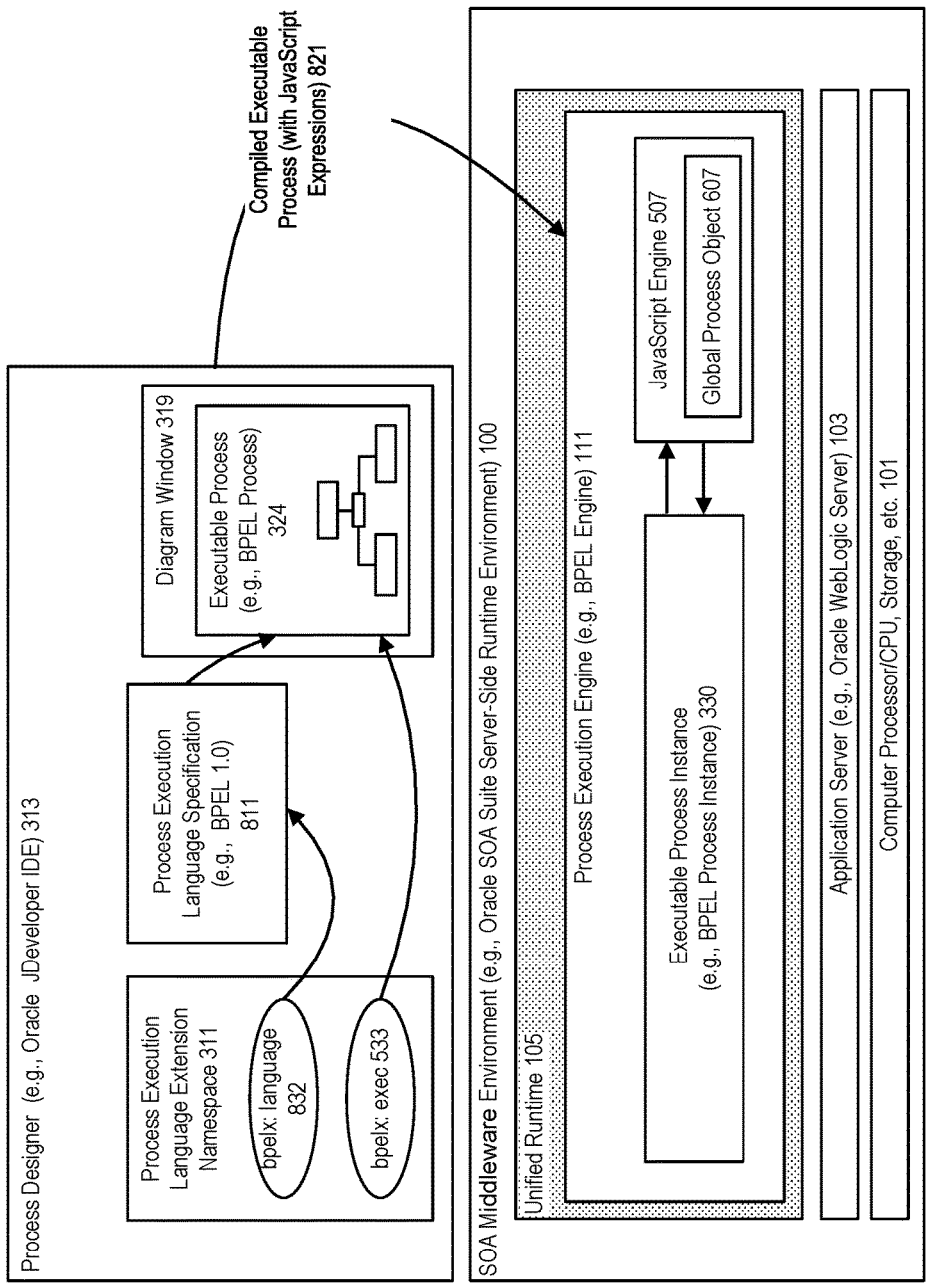
FIG. 8 illustrates a system for supporting JavaScript as an expression language in an executable process defined by a process execution language for execution in a SOA middleware environment, in accordance with an embodiment.

FIG. 8 illustrates a system for supporting JavaScript as an expression language in an executable process defined by a process execution language for execution in a SOA middleware environment, in accordance with an embodiment.

As shown in FIG. 8, the extension namespace 311 to a process execution language can define a "bpelx:language" attribute, and can be provided to the process designer to extend a process execution language specification 811 if needed. As described above, the existing "bplex:exec" attribute 533 defined in the extension namespace can also be extended to support JavaScript in an executable process defined by the process execution language.

In accordance with an embodiment, when designing an executable process based on a process execution language specification (for example, BPEL standard specification 2.0) that includes "expression language" or similar attribute, JavaScript can be directly specified as the value of the attribute. For example, the value of the attribute "urn:oasis:names:tc:wsbpel2.0:sublang:js" can be specified as "js" in an executable process based on the BPEL standard specification 2.0.

In accordance with an embodiment, when designing an executable process based on a process execution language specification (for example, BPEL standard specification 1.0) that does not include an "expression language" attribute or similar attribute can be extended using the extension namespace, the "bpelx:language" attribute defined in the extension namespace can be included on each node of the executable process that has an expression language type of functionality, and the value of the attribute can be specified as "js".

Alternatively, the "bpelx:language" attribute can be defined higher up in an document defining the executable process, to allow support for JavaScript as an expression language throughout the executable process. For example, the attribute can be defined with a global scope in a document, so that the attribute does not have to be repetitively defined in the executable process.

Listing 5 shows an example for using JavaScript as an expression language in an executable process defined by a process execution language, in accordance with an embodiment.

Listing 5

```
<while condition="process.counter < 5" bpelx:language="js">
    <sequence>
        <bpelx:js>process.counter++</bpelx:js>
    </sequence>
</while>
...
<pick>
    <onAlarm until="bpel.until(+30)">
```

As shown above in Listing 5, JavaScript is used as an expression language to implement a while loop, including accessing the values of the variable counter and performing calculations on the counter variables.

As further shown in FIG. 8, the executable process with JavaScript expressions can be compiled 821 and deployed to the process execution engine, which includes an integrated JavaScript engine for executing the JavaScript expressions.

Figure 9:
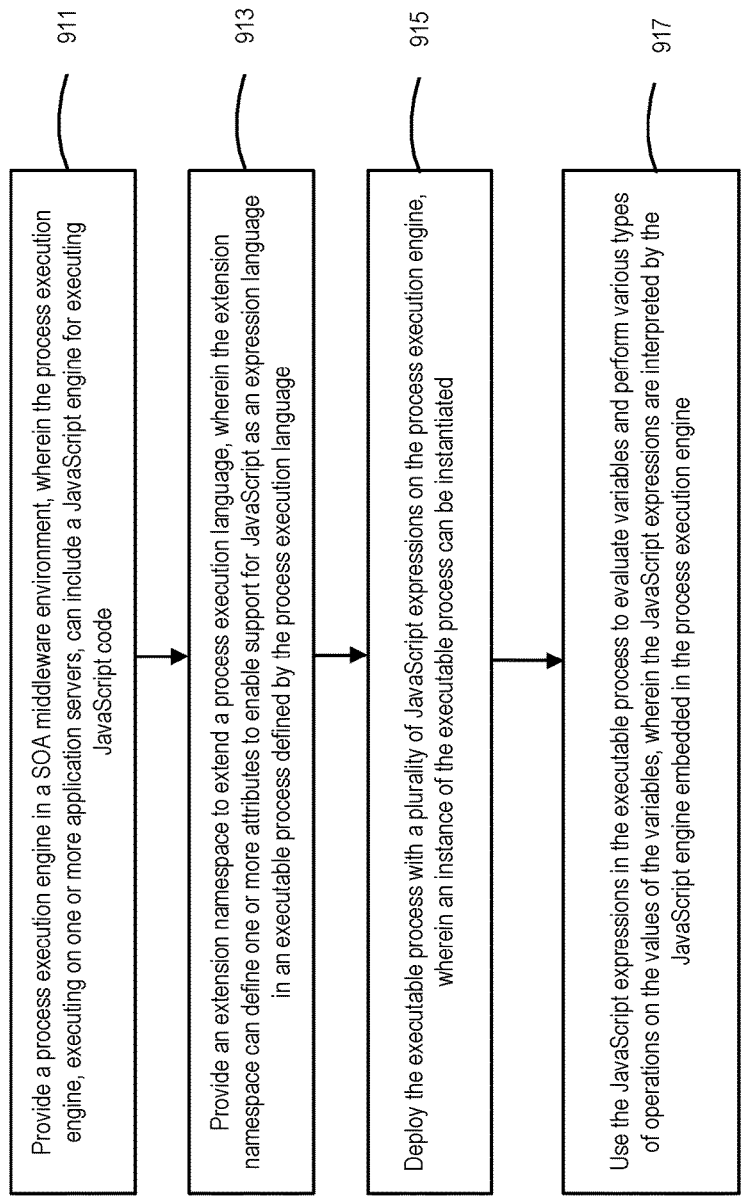
FIG. 9 illustrates a method for supporting JavaScript as an expression language in an executable process defined by a process execution language for execution in a SOA middleware environment, in accordance with an embodiment.

FIG. 9 illustrates a method for supporting JavaScript as an expression language in an executable process defined by a process execution language for execution in a SOA middleware environment, in accordance with an embodiment.

As shown in FIG. 9, at step 911, a process execution engine is provided in a SOA middleware environment, wherein the process execution engine, executing on one or more application servers, can include a JavaScript engine for executing JavaScript code.

At step 913, an extension namespace to the process execution language can define one or more attributes to enable support for JavaScript as an expression language in the executable process.

At step 915, the executable process can be deployed on the process execution engine, wherein an instance of the executable process can be instantiated thereon.

At step 917, the JavaScript expressions can be used to evaluate variables, and perform various types of operations on the values of the variables, wherein the JavaScript expressions are interpreted by the JavaScript engine in the process execution engine.

JavaScript Code Reuse in a SOA Middleware Environment

With the support for JavaScript as an activity and an expression language in an executable process defined by a process execution language, there is a need for reusing JavaScript code available in a SOA middleware environment.

In accordance with an embodiment, the system can include a unified runtime environment on an application server, wherein the unified runtime environment includes a process execution engine with an embedded JavaScript engine, and an executable process defined by a process execution language executing on the process execution engine. The system can further include a plurality of JavaScript libraries, each defining JavaScript variables with one of a SOA server scope, a component scope, or a process scope. These scopes and an execution scope of a JavaScript variable can form a JavaScript scope chain. When a JavaScript variable in an executable process is being resolved, the JavaScript engine can start in an execution scope of the JavaScript variable, and searches down the scope chain until the variable is resolved or the scope chain is exhausted.

In accordance with an embodiment, the JavaScript scope chain described above allows a process developer to reuse existing JavaScript code defined in other scopes as much as possible; and to define variables, functions or objects within an execution scope (either locally in a function or globally outside the function) only when those variables, functions or objects are not already defined in another scope. With support for such a JavaScript chain, JavaScript libraries in different places and within different scopes in a unified runtime environment can be loaded into the memory of a SOA server, to provide a runtime JavaScript API for use by an executable process in a SOA middleware environment.

In accordance with an embodiment, reuse of JavaScript code in an executable process defined by a process execution language such as a BPEL process can improve process performance and reduce resource consumption at runtime.

For example, a while loop can include hundreds of iterations, with each iteration resolving a same variable. Defining the variable with an execution scope in an executable process would require reloading the variable data hundreds of times, resulting in a waste of resources and reduction in performance. However, if defined within a parent scope, e.g., a component scope, the variable can still be accessed from an execution scope, but can be loaded just once in the component scope.

In accordance with an embodiment, a JavaScript scope defines a context in which a set of variables, objects, and functions can be accessible in JavaScript code. The variables, objects or functions defined in a particular scope can be accessed from within that scope and any scope up the scope chain.

For example, a Console object defined with a SOA server scope can be used by each component (for example, a process execution engine) on that SOA server (for example, a WebLogic server), each executable process within that component, and each execution scope within a particular executable process.

In accordance with an embodiment, when searching within a particular scope in the scope chain, an associated prototype chain of that scope can be exhausted first before moving down the scope chain to the next scope.

JavaScript implements inheritance using prototypes. Each JavaScript object can include a plurality of named properties, and a pointer to another object, which is the prototype object of that JavaScript object. The one or more prototype objects can form a prototype chain of the JavaScript object. When a property on the JavaScript object is being requested, the JavaScript engine first searches for the property on the JavaScript object itself. If the property is not found there, the JavaScript engine can search down the prototype chain until it either finds the requested property, or until it reaches the end of the prototype chain.

Figure 10:
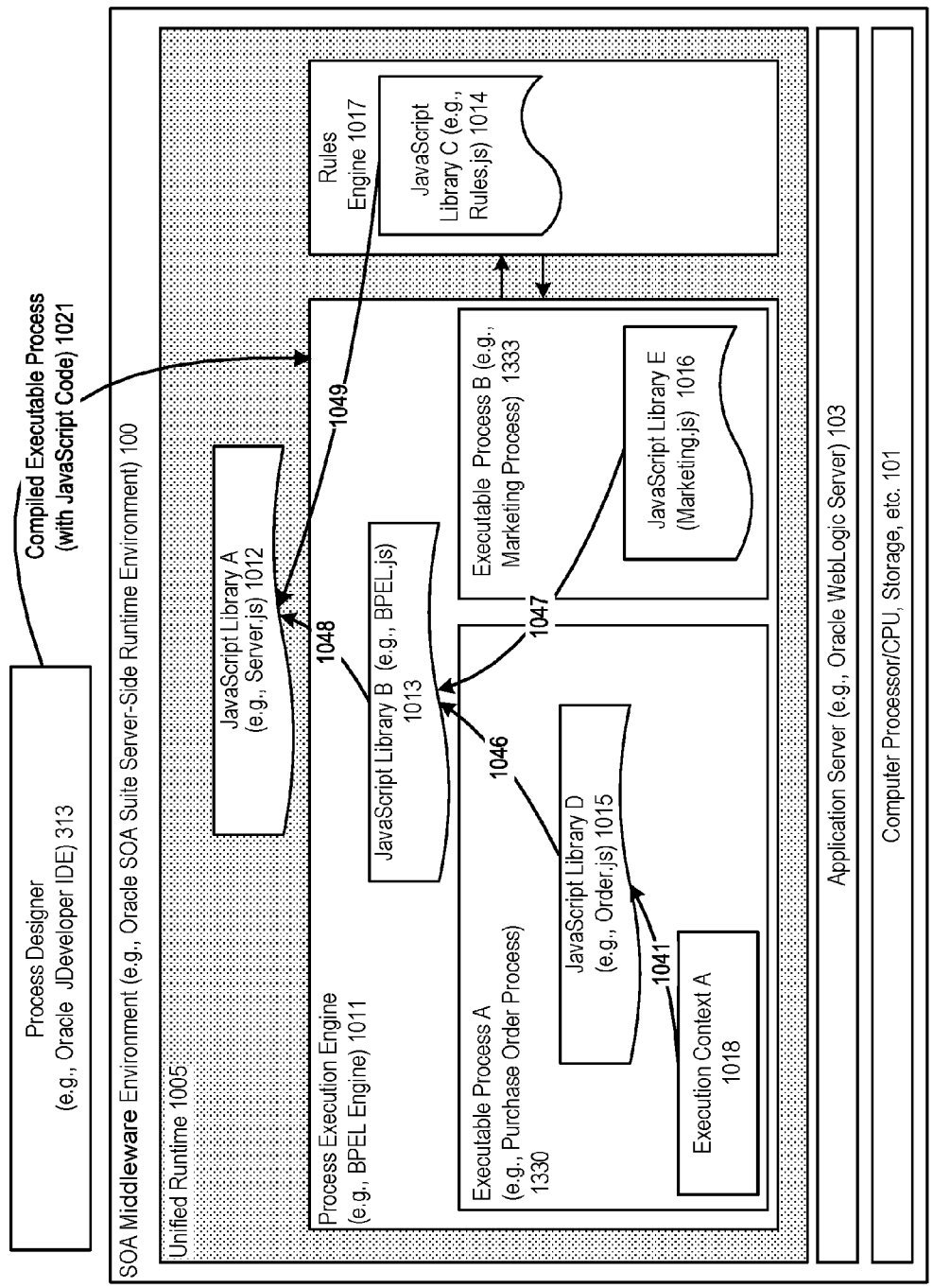
FIG. 10 illustrates a system for reusing JavaScript code in a SOA middleware environment, in accordance with an embodiment.

FIG. 10 illustrates a system for reusing JavaScript code in a SOA middleware environment, in accordance with an embodiment.

As shown in FIG. 10, a unified runtime 1005 on the application server can include a business rules engine 1017 and a process execution engine 1011, wherein the process execution engine includes a plurality of executable processes (for example, an executable process A 1330 and an executable process B 1333). Each executable process can be a BPEL process.

As further shown in FIG. 10, a plurality of JavaScript libraries (JavaScript libraries A 1012, B 1013, C 1014, D 1015 and E 1016) are deployed in the unified runtime, and each JavaScript library can define variables, objects or functions with one of a server scope, a component scope, or a process scope, wherein each scope corresponds to a particular environment in the SOA middleware environment.

For example, the JavaScript library A can define variables, objects or functions with a server scope that corresponds to the application server hosting the unified runtime. The JavaScript library B or C can define variables, objects or functions with a component scope corresponding to either the process execution engine component or the business rule engine component. Similarly, the JavaScript library D or E can define variables, objects or functions with a process scope corresponding to either the executable process A or the executable process B.

In accordance with an embodiment, when executable process A is executing, the JavaScript engine can resolve a variable within an execution scope, which can correspond to an execution context (for example, an execution context A 1018). The execution scope, process scope, component scope and server scope together can form a scope chain. The variables, functions and objects defined in each of the scopes on the scope chain can constitute a runtime JavaScript API for use by executable process A.

In accordance with an embodiment, the resolution of a variable can start at the execution scope. If the variable cannot be resolved with the execution scope, the JavaScript engine can search down the scope chain until the variable is resolved or the scope chain is exhausted.

In accordance with an embodiment, JavaScript code defining variables, functions or objects applicable to a server environment, a component environment or a process environment can be packaged into a JavaScript library and deployed to that environment.

For example, a server-scoped JavaScript library can be packaged into a library file "server.js" and deployed on a SOA server, wherein the JavaScript library is accessible to each of a plurality of components in the unified runtime on the SOA server. The plurality of components can include a BPEL engine, a human workflow engine, a business rules engine, and a mediator routing rules engine. The library can define a name of the SOA server, or a Console object used for writing log messages for the server.

Figure 11:
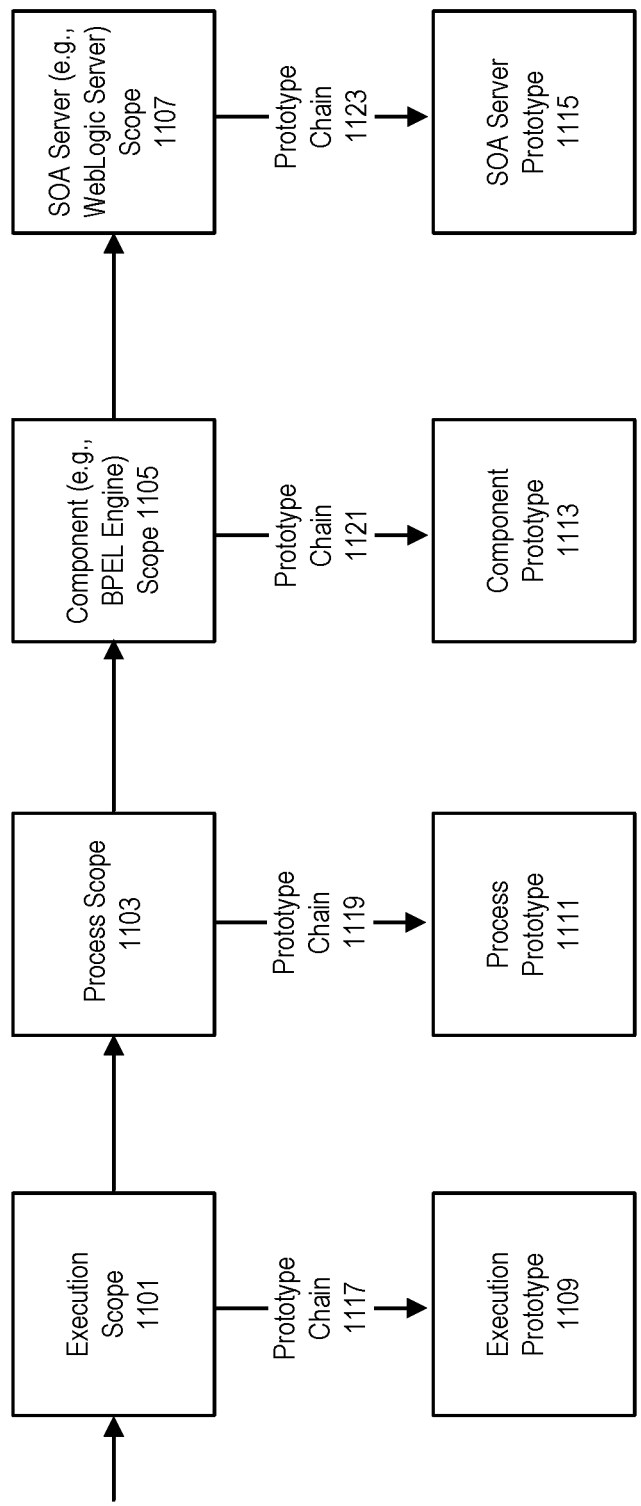
FIG. 11 illustrates a diagram of reusing JavaScript code in a SOA middleware environment, in accordance with an embodiment.

FIG. 11 illustrates a diagram of reusing JavaScript code in a SOA middleware environment, in accordance with an embodiment.

As shown in FIG. 11, the diagram includes a scope chain comprising an execution scope 1101, a process scope 1103, a component scope 1105, and a server scope. Each scope on the scope chain can include a prototype chain, for example a prototype chain 1117, 1119, 1121 or 1123.

In accordance with an embodiment, each prototype chain can include one or more prototype objects to provide an inheritance chain within that scope.

For example, the prototype chain for a variable, object or function in the execution scope can include an execution prototype 1109 representing a prototype object within the execution scope. Similarly, the process prototype 1111 can represent a prototype object within the process scope, the component prototype 1113 can represent a prototype object within the component scope, and the SOA server prototype can represent an object within the SOA server scope.

As described above, when a variable is being resolved within a particular scope, the associated prototype chain can be exhausted first before moving down to the next scope on the scope chain.

As an illustrative example, when resolving a variable in a JavaScript activity or in a JavaScript expression in a BPEL process, the JavaScript engine first can check whether the variable is defined within the execution scope. If yes, the variable can be resolved within the execution scope. If not, the JavaScript engine can move down the scope chain to the process scope to check if the variable is defined therein, including exhausting the associated prototype chain. If the variable is still not resolved, the JavaScript engine can continue the resolution process until the scope chain is exhausted. If the whole scope chain is exhausted and the variable cannot be resolved, an error can be thrown.

Figure 12:
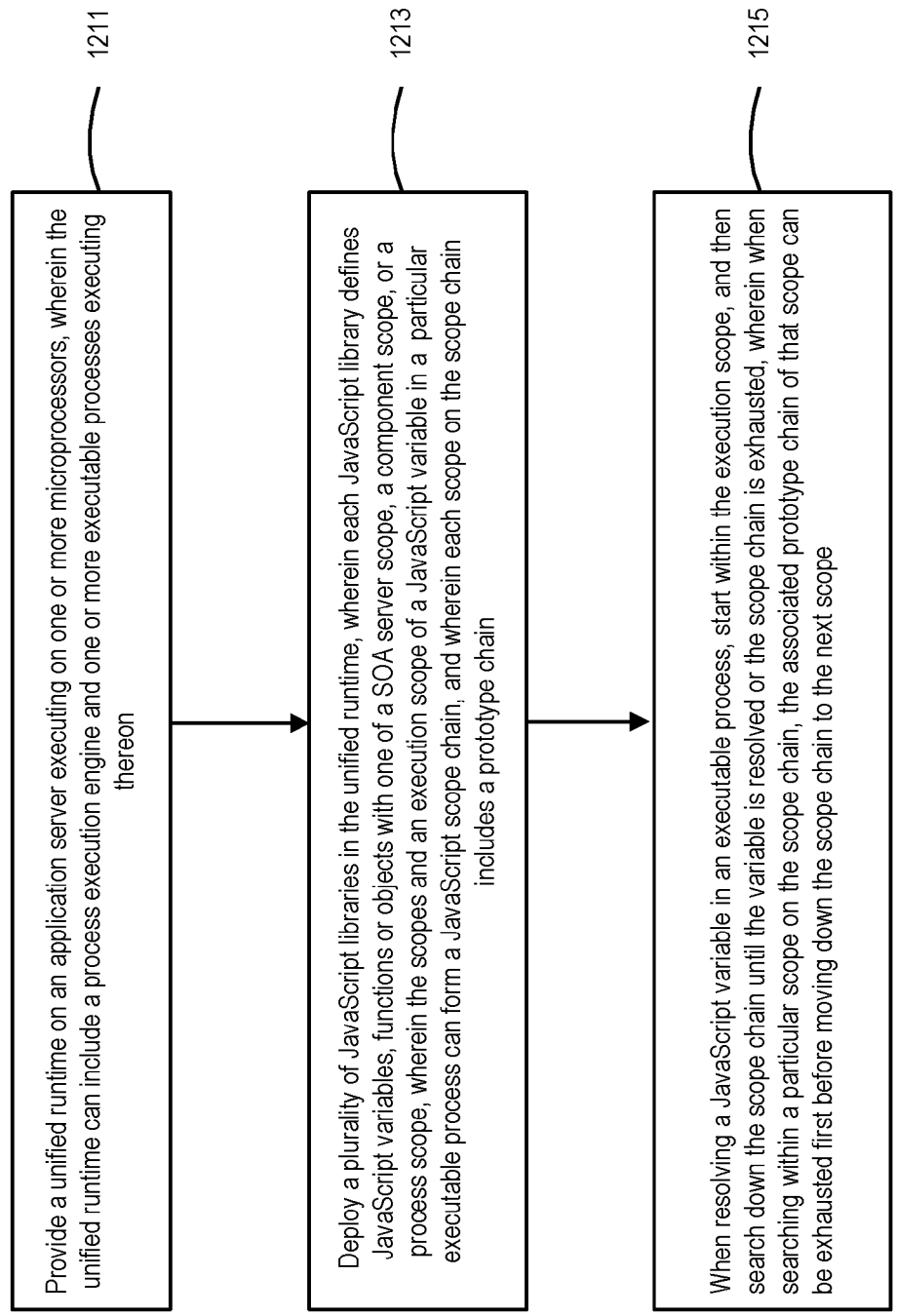
FIG. 12 illustrates a method for reusing JavaScript code in a SOA middleware environment, in accordance with an embodiment.

FIG. 12 illustrates a method for reusing JavaScript code in a SOA middleware environment, in accordance with an embodiment.

As shown in FIG. 12, at step 1211, a unified runtime can be provided on an application server executing on one or more microprocessors, wherein the unified runtime can include a process execution engine and one or more executable processes executing thereon At step 1213, a plurality of JavaScript libraries, each defining JavaScript variables, functions or objects with one of a SOA server scope, a component scope, or a process scope, can be provided on the SOA server, wherein the scopes and an execution scope of a JavaScript variable in a particular executable process can form a JavaScript scope chain, and wherein each scope on the scope chain includes a prototype chain.

At step 1215, when resolving a JavaScript variable in an executable process, the JavaScript engine starts within the execution scope, and then searches down the scope chain until the variable is resolved or the scope chain is exhausted, wherein when searching within a particular scope on the scope chain, the associated prototype chain of that scope can be exhausted first before moving down the scope chain to the next scope.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for supporting JavaScript as an expression language in executable processes defined by a process execution language, comprising:
    a computer including one or more microprocessors;
    a runtime environment on an application server executing on the computer, wherein the unified runtime environment includes a process execution engine, and a JavaScript engine embedded therein;
    an extension namespace that defines one or more attributes and one or more methods to enable JavaScript to be used as an expression language in a plurality of activities in an executable process defined by the process execution language,
    wherein the executable process further defines one or more representational state transfer (REST) partner links;
    wherein JavaScript expressions in each of the plurality of activities in the executable process are configured to access object notation variables and to access contents of extensible markup language (XML) variables in the executable process; and wherein when the executable process is compiled and executed on the process execution engine, a schema file defining the XML variables is validated and object notation variables associated with activities are not validated, while the JavaScript engine operates to execute the JavaScript expressions in the executable process, wherein a payload associated with an object notation variable from the object notation variables is requested and received from an external service using a REST partner link from the one or more REST partner links.

2. The system of claim 1, wherein JavaScript and XPath are both used as expression languages in the executable process.

3. The system of claim 1, the executable process is based on a process execution language specification that defines an expression language attribute, and wherein JavaScript is directly specified as the value of the attribute to support JavaScript as an expression language in the executable process.

4. The system of claim 1, the executable process is based on a process execution language specification that does not define an expression language attribute, and wherein JavaScript is specified as the value of a language attribute on each node of the executable process, wherein the language attribute has an expression language type of functionality.

5. The system of claim 1, wherein the process execution language is based on a business process execution language (BPEL) specification, and wherein the executable process is a BPEL process.

6. The system of claim 1, wherein the JavaScript engine is an open source JavaScript engine.

7. A method for supporting JavaScript as an expression language in executable processes defined by a process execution language, comprising:
  embedding a JavaScript engine into a process execution engine in a runtime environment on an application server executing on one or more microprocessors;
  defining one or more attributes and one or more methods in an extension namespace to enable JavaScript to be used as an expression language in a plurality of activities in an executable process defined by the process execution language,
  wherein the executable process further defines one or more representational state transfer (REST) partner links;
  configuring JavaScript expressions in the executable process to access object notation variables and to access contents of extensible markup language (XML) variables in the executable process; and
  wherein when the executable process is compiled and executed on the process execution engine, a schema file defining the XML variables is validated and object notation variables associated with activities are not validated, while the JavaScript engine operates to execute the JavaScript expressions in the executable process,
  wherein a payload associated with an object notation variable from the object notation variables is requested and received from an external service using a REST partner link from the one or more REST partner links.

8. The method of claim 7, wherein JavaScript and XPath are both used as expression languages in the executable process.

9. (Previously Presented The method of claim 7, the executable process is based on a process execution language specification that defines an expression language attribute, and wherein JavaScript is directly specified as the value of the attribute to support JavaScript as an expression language in the executable process.

10. The method of claim 7, the executable process is based on a process execution language specification that does not define an expression language attribute, and wherein JavaScript is specified as the value of a language attribute on each node of the executable process, wherein the language attribute has an expression language type of functionality.

11. The method of claim 7, wherein the process execution language is based on a business process execution language (BPEL) specification, and wherein the executable process is a BPEL process.

12. The method of claim 7, wherein the JavaScript engine is an open source JavaScript engine.

13. A non-transitory computer-readable storage medium storing a set of instructions for supporting JavaScript as an expression language in executable processes defined by a process execution language, said instructions, when executed by one or more processors, causing the one or more processors to perform the steps comprising:
  embedding a JavaScript engine into a process execution engine in a runtime environment on an application server executing on one or more microprocessors;
  defining one or more attributes and one or more methods in an extension namespace to enable JavaScript to be used as an expression language in a plurality of activities in an executable process defined by the process execution language,
  wherein the executable process further defines one or more representational state transfer (REST) partner links;
  configuring JavaScript expressions in the executable process to access object notation variables and to access contents of extensible markup language (XML) variables in the executable process; and
  wherein when the executable process is compiled and executed on the process execution engine, a schema file defining the XML variables is validated and object notation variables associated with activities are not validated, while the JavaScript engine operates to execute the JavaScript expressions in the executable process,
  wherein a payload associated with an object notation variable from the object notation variables is requested and received from an external service using a REST partner link from the one or more REST partner links.

14. The non-transitory computer-readable storage medium of claim 13, wherein JavaScript and XPath are both used as expression languages in the executable process.

15. The non-transitory computer-readable storage medium of claim 13, the executable process is based on a process execution language specification that defines an expression language attribute, and wherein JavaScript is directly specified as the value of the attribute to support JavaScript as an expression language in the executable process.

16. The non-transitory computer-readable storage medium of claim 13, the executable process is based on a process execution language specification that does not define an expression language attribute, and wherein JavaScript is specified as the value of a language attribute on each node of the executable process, wherein the language attribute has an expression language type of functionality.

17. The non-transitory computer-readable storage medium of claim 13, wherein the process execution language is based on a business process execution language (BPEL) specification, and wherein the executable process is a BPEL process.

18. The non-transitory computer-readable storage medium of claim 13, wherein the JavaScript engine is an open source JavaScript engine.

* * * * *

UNITED STATES PATENT AND TRADEMARK OFFICE
CERTIFICATE OF CORRECTION

PATENT NO. : 10,223,143 B2
APPLICATION NO. : 15/075713
DATED : March 5, 2019
INVENTOR(S) : Chmielewski et al.

Page 1 of 1

It is certified that error appears in the above-identified patent and that said Letters Patent is hereby corrected as shown below:

In the Specification

In Column 10, Line 26, delete "objet" and insert -- object --, therefor.

In Column 15, Line 64, delete "thereon" and insert -- thereon. --, therefor.

In the Claims

In Column 18, Line 1, in Claim 9, after "9." delete "(Previously Presented)".

Signed and Sealed this
Twenty-fifth Day of February, 2020

Andrei Iancu
*Director of the United States Patent and Trademark Office*